United States Patent [19]

Nelson

[11] 3,889,900

[45] June 17, 1975

[54] CARTRIDGE TAPE GUIDE

[75] Inventor: Norman E. Nelson, Roseville, Minn.

[73] Assignee: Alexander, Sell, Steldt & DeLaHunt, St. Paul, Minn.

[22] Filed: Aug. 1, 1973

[21] Appl. No.: 384,596

[52] U.S. Cl. .................................. 242/199; 242/76
[51] Int. Cl. .......................................... G11b 23/10
[58] Field of Search ........... 242/199, 200, 198, 194, 242/76, 71, 2; 352/72, 78

[56] References Cited

UNITED STATES PATENTS

| | | | |
|---|---|---|---|
| 2,916,228 | 12/1959 | Wellington | 242/76 |
| 3,143,270 | 8/1964 | Cohen | 242/76 X |
| 3,306,548 | 2/1967 | Polder | 242/76 X |
| 3,642,229 | 2/1972 | Downey et al. | 242/199 |
| 3,712,559 | 1/1973 | Schwartz | 242/76 |

*Primary Examiner*—George F. Mautz
*Attorney, Agent, or Firm*—Alexander, Sell, Steldt & DeLaHunt

[57] ABSTRACT

A nonrotatable tape guide for a recording tape cartridge is formed of a fixed post, which protrudes from an inner surface of one of the cartridge sidewalls, and a low friction sleeve disposed on the post. In a first embodiment the sleeve has a concave sidewall that defines two substantially equal openings. A second embodiment also includes a concave sidewall but differs from the first embodiment in that one of the two openings defined by the sidewall is approximately one-half the diameter of the other opening to present a concial like shape.

6 Claims, 6 Drawing Figures

CARTRIDGE TAPE GUIDE

BACKGROUND OF THE INVENTION

1. Field of the Invention

The present invention relates in general to magnetic recording tape cartridges and more specifically to a nonrotatable tape guide for such cartridges.

2. Description of the Prior Art

Typical tape cartridges include a case with spaced apart sidewalls, at least one tape supporting spool or platform rotatably disposed between the case sidewalls, and a pair of tape guide members that may be either rotatably or nonrotatably pin mounted in the cartridge case to bridge between the side-walls.

Several constructions of nonrotatable tape guide members are known in the art, the most common in use being formed of a fixed mounting post that protrudes from an inner surface of one of the sidewalls and has a low friction, cylindrically shaped sleeve affixed thereon. A second known construction also includes a fixed mounting post and sleeve design, but differs from the more common construction in that the sleeve has a substantially conical shape particularly advantageous for employment in an eight-track cartridge having an endless tape. Such tape is conventionally wound on a single tape platform and is payed out from the center of the platform to first travel over the remaining wound tape and then to a first tape guide member in an arcuate path. Consequently the payed out tape does not run perpendicularly to the longitudinal axis of the first tape guide member, but rather engages the sleeve of the first guide member in a skewed fashion. Under such conditions, a guide member having a conically shaped sleeve maximizes contact with the tape and also redirects the tape to run perpendicularly to the longitudinal axis of the guide member.

Although both of the above described guide member constructions have proved to be operationally satisfactory for use in existing cartridges, they both fail to provide tape centering pressures to achieve optimum tracking and dynamic skew control. With the introduction of high audio fidelity tapes, a tape guide that furnishes tape centering pressures is highly desirable.

SUMMARY OF THE INVENTION

The present invention provides a nonrotatable tape guide for a recording cartridge and includes a low friction cylindrically shaped sleeve disposed on a fixed mounting post protruding from one of the inner sidewalls of the cartridge case. The sleeve has a concave sidewall that develops tape centering forces to maintain the tape in an optimum tracking position.

In a first embodiment the sleeve is substantially symmetrical about a plane through the midpoint of and perpendicular to the longitudinal axis of the sleeve so that the curved sidewall of the sleeve defines two nearly equal openings. As tape advances about this embodiment, the covcave sidewall applies pressure on the tape that biases the tape substantially in a centered position on the guide.

The above described embodiment may also be modified in such fashion that one end of the sidewall of the guide has an outer flange for orienting the guide with one side of the cartridge so that if more than one guide is employed in the cartridge, they will all have a positive reference to a common side of the cartridge. Another modification that is disclosed is that the sleeve may be elliptical in shape while the mounting post has a generally cylindrical configuration of such size that the elliptically shaped sleeve must be deformed to be mounted on the guide post. The sleeve is formed from a relatively stiff resilient material that has a spring retention effect to securely hold the sleeve on the post.

In a second embodiment the concave sidewall of the sleeve defines two openings that differ in size from one another. Thus, the sleeve has a conical like configuration that is particularly advantageous for use in eight-track cartridges. Not only does this embodiment provide the tape centering pressure of the first embodiment, but in addition also serves to provide optimum tape contact with tape that engages the guide on a line that is skewed with respect to the longitudinal axis of the sleeve.

The foregoing and other advantages of the present invention will appear from the following description. In the description reference is made to the accompanying drawings, which form a part hereof, and in which there is shown by way of illustration, and not of limitation, specific forms in which the invention may be embodied. Such embodiments do not represent the full scope of the invention, but rather the invention may be employed in a variety of embodiments, and reference is made to the claims herein for interpreting the breadth of the invention.

DESCRIPTION OF THE PREFERRED EMBODIMENTS

Figure 1:
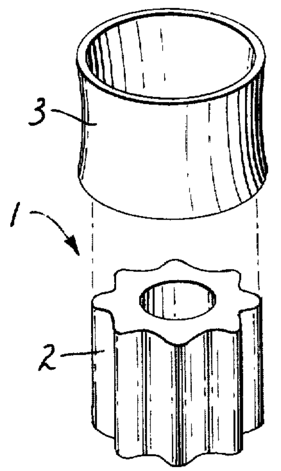
FIG. 1 is an exploded perspective view of a first embodiment of the guide member of the present invention.

Referring now to the drawings and specifically to FIG. 1, there is shown a fixed tape guide 1 that represents a first preferred embodiment of the present invention. The guide 1 includes a generally cylindrically shaped mounting post 2, and a sleeve 3 that can either be affixed on the post 2 with a friction fit or adhered thereto. The sleeve 3 has a cylindrical configuration and is formed of a low friction material that may be either a plastic compound or a metal such as brass or stainless steel. The sleeve 3 has a concave sidewall that is substantially symmetrical about a plane through the midpoint of and perpendicular to the longitudinal axis of the sleeve 3. Preferably the sleeve 3 should be perfectly symmetrical about such a plane but as a result of forming the sleeve by drawing it out in a number of steps, the sleeve may tend to have a minute taper or radius differentail and, thus, be slightly asymmetrical.

Figure 2:
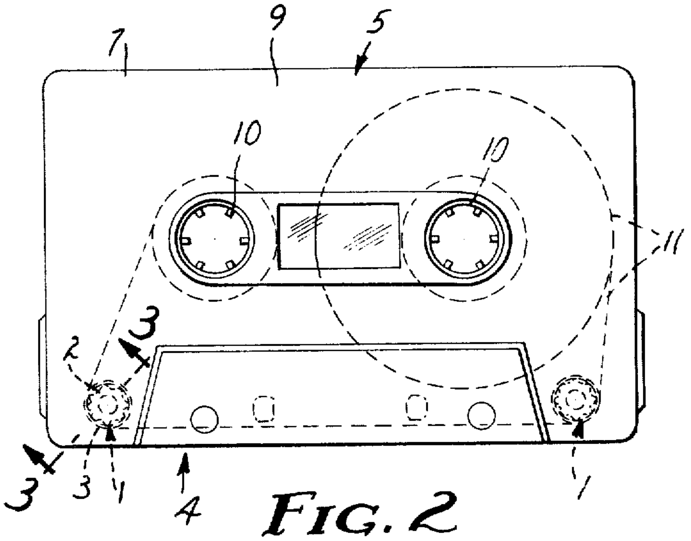
FIG. 2 is a plan view of a typical tape cassette with two guide members similar to that of FIG. 1 and the internal components of the cassette indicated in dotted lines.
Figure 3:
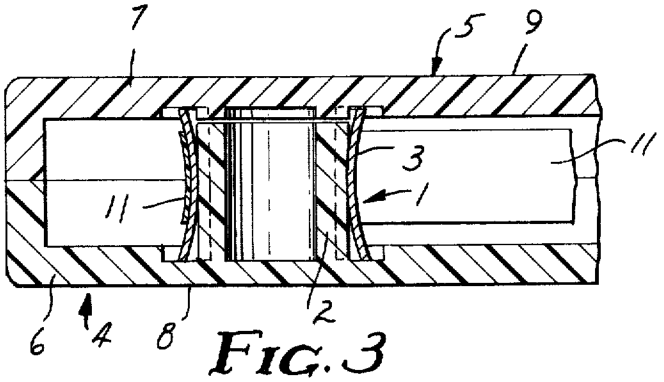
FIG. 3 is a view in cross section taken through the plane 3—3 indicated in FIG. 2.

Referring now to FIGS. 2 and 3, the disposition of two of the fixed guides 1 in a tape recording cassette 4 is illustrated. However, it is not essential that the present invention be employed solely in such a cassette. Rather, the present invention is adapted for use with various types of tape cartridges requiring tape guides. The cassette 4 has a rectangular, hollow plastic case 5 formed from a pair of casing members 6 and 7 held together by ultrasonic welding, screws or other suitable fastening methods. The casing members 6 and 7 each include a substantially planar sidewall 8 and 9 respectively and are sufficiently spaced apart from one another to accommodate a pair of disk like spools 10 around which a tape 11 is wound. During operaton of the cassette on a tape transport, the tape 11 travels between the spools 10 and is guided in such travel by the two guides 1, which are disposed near one peripheral edge of the case 5.

The two guides 1 are each mounted in an identical manner in the case 5, and for purposes of clarity and brevity the mounting of only one of the guides will be described by referring to FIG. 3. The guide 1 of FIG. 3 is interposed between the sidewalls 8 and 9 of the case 5. The mounting post 2 of the guide 1 is formed integrally with the inner surface of the sidewall 8 and the sleeve 3 is affixed thereto. The tape 11 is fragmentarily shown wrapped about the sidewall of the sleeve 3, centered between the upper and lower ends of the sleeve 3.

The concave configuration of the sleeve 3 produces pressure on the tape 11 to urge the tape to the centered position shown in FIG. 3. Such pressure is manifested in the form of centering forces on each edge of the tape 11 and results because of the tension exerted on the tape as it advances around the sleeve 3. In a centered position on the guide 1 the forces exerted on the edges of the tape are equal in magnitude and direction. However, should the tape move upward or downward on the sleeve 3 away from a centered position on the guide 1, the curvature of the sleeve sidewall will increase the tension on the tape edge outermost from the sleeve center, while concurrently lowering the tension on the innermost tape edge. The increased tension on the outer tape edge produces a force with a component that opposes the uncentering movement of the tape and exceeds an opposite component of force that is a result of tension on the inner tape edge. This difference in forces exerted on the tape 11 urges the tape back toward a centered position on the guide 1.

Figure 4:
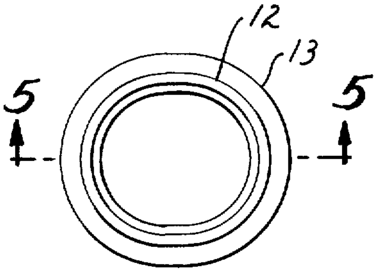
FIG. 4 is a plan view of a guide member sleeve similar to that of FIG. 1 except that it has an elliptical form and a flange at one end.
Figure 5:
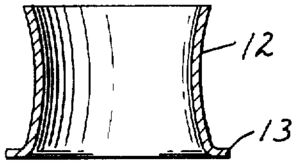
FIG. 5 is a view in cross section taken through the plane 5—5 indicated in FIG. 4.

Referring now to FIGS. 4 and 5, the guide member sleeve 3 may be modified to define an out of round, elliptical form as represented by the sleeve 12. The size of the sleeve 12 is chosen so that it mates with the cylindrically shaped mounting post 2 in a friction fit and must be deformed out of its normal elliptical shape to fit on the mounting post 2. The sleeve 12 is resilient, and in attempting to return to its normal shape it has a spring retention effect to securely hold the sleeve 12 on the post 2. This same effect may also be achieved by employing a cylindrically shaped sleeve together with an out of round mounting post.

The sleeve 12 also has a flange 13 disposed on one end forming a bell that facilitates the positioning of the sleeve 12 on the post 2. The flange 13 also serves for orienting the sleeve 12 with one side of the cartridge in which it is inserted in order that if more than one guide is employed in a cartridge, each such guide will have a positive reference to a common side of the cartridge. Such a reference is useful since as previously discussed for the sleeve 3, the drawing out operation used to form the sleeve 12 may produce a slight taper in the sleeve so that the end of the sleeve 12 that is drawn out is slightly different than the opposite end. When mounting more than one of the sleeves 12 in a cartridge it is preferable that the same sized end of each guide is adjacent the same side of the cartridge. In this way the taper of each sleeve 12 will be in the same direction and will have a uniform effect on tape tracking from cassette to cassette.

Figure 6:
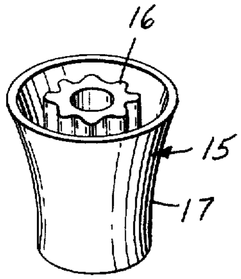
FIG. 6 is a perspective view of a second embodiment of the present invention.

Referring now to FIG. 6, a guide 15 that forms a second embodiment of the present invention is shown. Similar to the guide 1, the guide 15 includes a mounting post 16 and a sleeve 17 having a concave sidewall. The guide 15 differs from the guide 1 in that the sidewall of the sleeve 17 has a conical like configuration that defines two differently sized openings, with one of the openings being as great as twice the size of the other. The guide 15 is adapted to be employed for guiding tape that engages the sleeve 17 in a skewed fashion as occurs in eight-track endless tape cartridges. Similar to the sidewall of the first guide 1, the sidewall of the guide 15 provides forces that tend to bias tape guided thereby in a substantially centered position on the sleeve 17. Moreover, in addition to the advantage of providing these centering forces, the conical like configuration of the sleeve 17 permits optimum engagement with tape that does not run perpendicularly to the longitudinal axis of the guide sleeve, and the guide 15 may be so shaped that it will redirect the travel of such tape on a line perpendicular to the longitudinal axis of the sleeve 17.

There has thus been describeed two embodiments of a nonrotatable tape guide that provides advantages previously unachieved. The concave concave configuration of the sidewalls of each of these embodiments serve to produce centering forces that act on the tape guided by the guides to aid to maintaining the tape in a centered relationship with respect to the guides. Accordingly, optimum tape tracking and dynamic skew control is furnished by the present invention.

What I claim is:

1. In a tape cartridge the combination comprising:

a case with spaced apart sidewalls;

at least one fixed mounting post protruding from an inner surface of one of said sidewalls and disposed near one peripheral edge of said case;

a sleeve formed from a low friction material and affixed on said post, said sleeve having a concave sidewall that exerts centering forces on tape that is guided by said sleeve; and one of said post and said sleeve is out of round and the other is cylindrically shaped, and said sleeve is of such size that it is deformed from its normal shape to fit on said post with a friction fit and have a spring retention effect to securely hold the sleeve on the post.

2. A tape cartridge as recited in claim 1 wherein said sleeve has a flange at one end that serves as a positive reference for positioning said sleeve in said case.

3. A tape cartridge as recited in claim 1 wherein said sleeve is symmetrical about a plane through the midpoint of and perpendicular to the longitudinal axis of the sleeve.

4. A tape cartridge as recited in claim 1 wherein said sleeve defines two openings that are substantially different in size and the sleeve has a conical like configuration.

5. In a tape cartridge the combination comprising:

a case with spaced apart sidewalls;

at least one fixed mounting post protruding from an inner surface of one of said sidewalls and disposed near one peripheral edge of said case; and an elliptically shaped sleeve formed from a low friction material and affixed on said post, said sleeve having a concave sidewall that is substantially symmetrical about a plane through the midpoint of and perpendicualr to the longitudinal axis of the sleeve and a flange that forms a bell on one end of the sleeve for facilitating the mounting of said sleeve on said post.

6. In a tape cartridge the combination comprising:

a case with spaced apart sidewalls;

at least one fixed mounting post protruding from an inner surface of one of said sidewalls and disposed near one peripheral edge of said case; and a sleeve formed from a low friction material and affixed on said post, said sleeve having a concave sidewall that exerts centering forces on tape that is guided thereby and said sleeve is resilient, is elliptically shaped and is of such size that it is deformed from its normal shape to fit on said post with a friction fit and have a spring retention effect to securely hold the sleeve on the post.

* * * * *

UNITED STATES PATENT OFFICE
CERTIFICATE OF CORRECTION

PATENT NO. : 3,889,900

DATED : June 17, 1975

INVENTOR(S) : Norman E. Nelson

It is certified that error appears in the above-identified patent and that said Letters Patent are hereby corrected as shown below:

Column 2, line 65, change "differentail" to --differential--.

Column 3, line 12, change "operaton" to --operation--.

Column 4, line 34, change "describeed" to --described--;

line 36, change "concave concave configuration" to --concave configuration--.

Signed and Sealed this

*second* Day of *December 1975*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,889,900

DATED : June 17, 1975

INVENTOR(S) : Norman E. Nelson

It is certified that error appears in the above-identified patent and that said Letters Patent are hereby corrected as shown below:

Change the listed Assignee from Alexander, Sell, Steldt & DeLaHunt to Minnesota Mining and Manufacturing Company.

Signed and Sealed this

*tenth* Day of *February 1976*

[SEAL]

*Attest:*

RUTH C. MASON
*Attesting Officer*

C. MARSHALL DANN
*Commissioner of Patents and Trademarks*